United States Patent [19]

Graft

[11] Patent Number: 4,653,773
[45] Date of Patent: Mar. 31, 1987

[54] ADJUSTABLE STEERING STOP APPARATUS

[75] Inventor: Ronald W. Graft, Fort Wayne, Ind.

[73] Assignee: Dana Corporation, Toledo, Ohio

[21] Appl. No.: 809,602

[22] Filed: Dec. 16, 1985

[51] Int. Cl.$^4$ ............................................. B60G 7/04
[52] U.S. Cl. ................... 280/673; 180/257; 192/138
[58] Field of Search .............. 280/673, 93, 95 R; 180/257; 192/116.5, 138, 139, 143

[56] References Cited

U.S. PATENT DOCUMENTS

| | | | |
|---|---|---|---|
| 1,981,173 | 11/1934 | Herrington | 180/257 |
| 2,145,089 | 1/1939 | Kysor | 180/259 |
| 2,356,164 | 8/1944 | Keese | 180/254 |
| 3,191,708 | 6/1965 | Simonds et al. | 180/250 |
| 4,327,927 | 5/1982 | Tanaka et al. | 280/673 |
| 4,330,052 | 5/1982 | Schymick | 192/143 |
| 4,536,003 | 8/1985 | Maurer et al. | 280/95 R |

Primary Examiner—John J. Love
Assistant Examiner—Kenneth R. Rice
Attorney, Agent, or Firm—Frank B. McDonald

[57] ABSTRACT

A steering axle stop for an axle steering joint assembly is defined by a stub shaft rigidly supported within a steering knuckle boss. In a preferred form, the stub shaft contains a plurality of apertures which extend through the shaft and perpendicularly to the longitudinal axis of the shaft. The steering knuckle boss is pivotal relative to the axle housing, and the stub shaft extends through an aperture of the boss which has its axis extending tangentially to the swing movement of the boss. The stub shaft is rigidly secured in any one of the selectable apertures by means of a clevis pin which extends through the boss perpendicularly to the latter swing movement. Also in a preferred form, the axle housing contains a projection which includes a contact surface disposed for limiting the rotation of the steering knuckle via contact of one end of the stub shaft with the latter surface. In a preferred form, the contact surface is concave and is geometrically shaped to accomodate abutting contact with one end of the stub shaft upon pivotal movement of the boss regardless of aperture selection.

10 Claims, 3 Drawing Figures

ADJUSTABLE STEERING STOP APPARATUS

BACKGROUND OF THE INVENTION

This invention relates to vehicles of the type having adjustable steering stops for axle steering joint assemblies. More particularly, the invention relates to apparatus disposed for repeated contact with a designated surface of an axle housing for purposes of limiting pivotal movement of a steering knuckle.

Numerous prior art devices are employed for the purpose of providing adjustable stops or rotation limiting devices for steering knuckles. The bulk of such devices, however, are of an infinitely adjustable nature, typically comprising a threaded bolt having a head for contacting a portion of the axle housing. Such systems suffer from several drawbacks. First, the use of tools, such as a wrench or screw driver, is required for adjustment. Secondly, the threaded members often can become jammed resulting in damage to threads and loss of subsequent adjustability.

Thirdly, such devices have lacked specific indicators of or means for determining the degree of rotatability of the steering knuckle relative to the axle. Thus, the devices have been without visual or other indication as to selectable limits of steering knuckle rotation relative to the axle members.

SUMMARY OF THE INVENTION

The invention disclosed and described herein provides a steering stop apparatus which alleviates the aforenoted drawbacks of the prior art. Specifically, the stop apparatus of the present invention does not require tools for adjustment, which facilitates simple field changes of steering angle. In addition, the apparatus of the present invention does not include threaded members which, as noted, are potentially subjected to damage. Finally, the stop apparatus of the present invention contains a positive indication in any selected position of the apparatus as to rotational or pivotal limits of the steering knuckle.

In a preferred form, the steering stop apparatus is defined by a cylindrical stub shaft which extends through an aperture of a steering knuckle boss. The stub shaft contains a plurality of apertures which extend laterally through the shaft body. The apertures of the stub shaft are disposed for selectively receiving a removable clevis pin for securing any given one of the apertures rigidly with respect to the knuckle boss, as selected by an operator of the associated vehicle.

In the preferred form, the boss contains a mark such as an arrow disposed for registration with an associated arrow positioned adjacent each of the apertures in the stub shaft for alignment with the boss arrow. Each aperture is associated with a rotational limit which is indicated as a number representing degrees of free pivotal movement of the steering knuckle for each stub shaft aperture selection.

Finally, the axle housing includes a contact surface disposed for making repetitive contact with one end of the stub shaft. In the preferred form, the contact surface is concave and is disposed for abutting the stub shaft regardless of which aperture is selected.

DETAILED DESCRIPTION OF A PREFERRED EMBODIMENT

Figure 1:
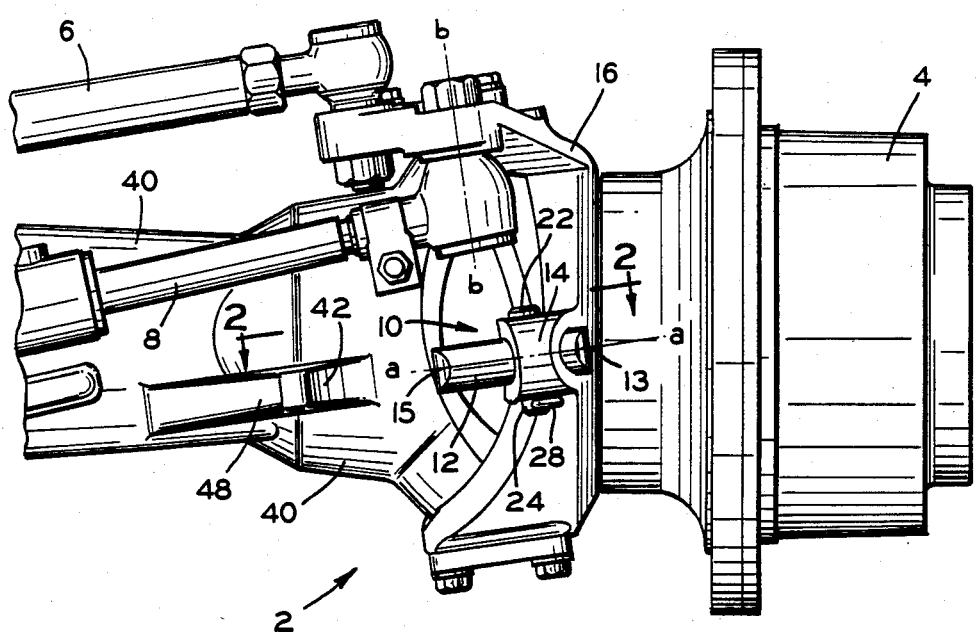
FIG. 1 is a fragmented plan view of a steering axle assembly which incorporates a preferred embodiment of the present invention.

Referring initially to FIG. 1, a conventional steering axle assembly 2 includes a wheel hub 4 rigidly secured to a pivotal steering knuckle 16. A tie rod end 8 is coupled conventionally to the knuckle 16 as will be appreciated by those skilled in the art. The knuckle 16 is pivotal relative to an axle housing 40, and rotation of the knuckle is achieved by means of a conventional steering linkage 6.

Figure 2:
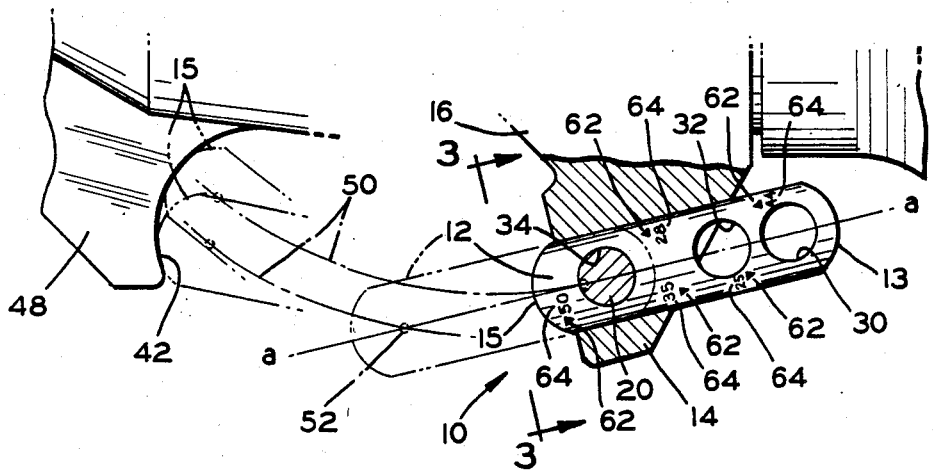
FIG. 2 is a partial sectional view along lines 2—2 of FIG. 1.

An adjustable steering stop apparatus is provided to limit the amount of steering knuckle rotation, as shown generally at 10 in FIG. 2. The stop apparatus 10 includes an elongated member 12 which in the preferred form is a cylindrical stub shaft, having ends 13 and 15 at opposite extremities of the shaft 12. A boss 14 extends laterally outwardly of a steering knuckle 16, the boss being an integral part of the pivotal knuckle 16. The boss contains an aperture 18 (see FIG. 3) disposed for containment of the stub shaft 12 within the boss 14.

A plurality of apertures 30, 32, and 34 are disposed from approximately the midpoint of the shaft to the extremity defining the end 13 thereof. The apertures 30,32,34 extend transversely through the shaft perpendicularly to the longitudinal axis a—a of the stub shaft 12.

It will be appreciated by those skilled in the art that the steering knuckle 16 rotates about an axis b—b (FIG. 1) relative to a projection 48 integral with the axle housing 40. It will be appreciated that the apertures 30,32,34 may be utilized to secure the stub shaft 12 rigidly within the aperture 18, securely holding the same with respect thereto in a finite number of positions. For this purpose, the boss 14 also includes a transversely extending aperture designed to accommodate a clevis pin 20 (FIG. 3) which may removably extend therethrough for purposes of selecting one of the apertures of the stub shaft for securement in the boss. The clevis pin 20 has a head 22 and an end 24, the latter of which contains a transverse bore 26 for receiving a pull pin or cotter pin 28 for securement of the clevis pin 20 within a transverse aperture 19.

The axle housing 40 includes an integral contact surface having a geometric shape and size positioned and disposed for accommodating the end 15, or alternatively 13 as will be explained hereinbelow, regardless of which aperture of the stub shaft is being utilized. Thus it will be seen that whenever a different aperture 30,32,34 is utilized for achievement of a selected stop limit, the end 15 will contact the surface 42 in a different location. Thus it will be noted that the path of a centroid 52 on the shaft 12 will define a swing arc 50 between the limits of rotation of the boss 14, and that the centroid 52 will traverse a different, although concentric, swing arc for each aperture choice selected. For this purpose, the surface 42 must have a lateral extent great enough to receive the ends 13 and 15 in all possible respective positions. In the preferred embodiment, the surface 42 is part of the projection 48 extending from and integral with the axle housing 40.

Figure 3:
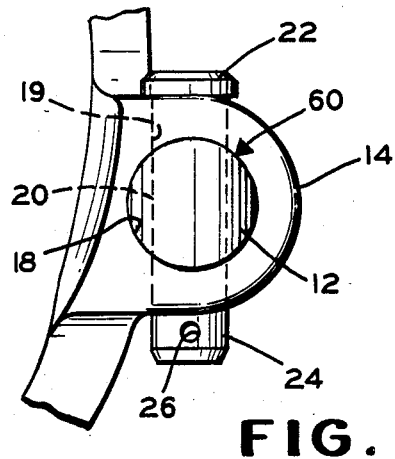
FIG. 3 is a view along lines 3—3 of FIG. 2.

Referring now particularly to FIG. 3, it will be noted that the boss 14 includes an arrow 60 disposed for selective registration with one of the alignment arrows 62 on the stub shaft 12 shown in FIG. 2. It will also be noted that each of these arrows is associated with a numerical indication which reflects the number of degrees of the swing arc 50 associated with that particular aperture selection. Thus, in the position shown in FIG. 1, the arrow 62 associated with the numeral "50" is shown to be in registration with the arrow 60 on the boss 14 (FIG. 3). In this position, the centroid 52 will rotate about an arc of 50° as indicated. If, however, the apertures for the numerical indications of "35" or "25" degrees of arc are selected, the end 15 will accommodate only 35 or 25 degrees of swing, respectively.

It will be noted that the arrows 62 associated with the numerical indications of "28" and "44" degrees of arc have an opposite orientation relative to the arrows previously described. For selection of the latter choices of swing arc, the stub shaft 12 must be completely removed from the aperture 18, and turned end for end and reinserted within the aperture. This action will place the opposite end 13 of the stub shaft 12 in a position for contact with the surface 42. Thus, it will be appreciated that two of the apertures, apertures 32 and 34, will each be effective to provide two swing arc limit selections, depending on the orientation of the stub shaft.

Although only one preferred embodiment has been detailed and described herein, the following claims are envisioned to cover numerous alternative embodiments which may fall within the spirit and scope thereof.

What is claimed is:

1. In an axle assembly including an axle housing, a steering joint coupled with said housing, said steering joint including a steering knuckle pivotal through an arc, said assembly also including a steering stop apparatus including stop means on said housing; an improvement comprising an adjustable steering axle stop apparatus defining an elongated member selectively fixed to said steering knuckle, said member having one of its ends disposed for contacting said stop means, said member having means for rigid securement thereof in a finite plurality of selective positions along said member, said stop means being effective to limit the angle of pivotal movement of said steering knuckle relative to said axle housing, said elongated member defining a cylindrical stub shaft, said axle assembly further comprising a boss fixed to said steering knuckle and pivotal therewith to define a swing arc, said boss comprising a pair of apertures, a first of said apertures disposed for containment of said stub shaft, said first aperture extending tangentially to said arc, the second of said apertures in said boss extending perpendicularly to an intersecting said first aperture, said second aperture disposed for containment of a removable clevis pin for selectively securing said stub shaft within said first aperture, wherein said means for securement of said stub shaft within said boss comprises a plurality of spaced apertures extending laterally through said stub shaft, each of said apertures representing selectable angular movement limits of said pivotal knuckle boss relative to said axle housing, a first plurality of said apertures positioned in reference to one end of said stub shaft, the other plurality of apertures corresponding with the opposite end of said stub shaft, each of said pluralities or apertures oriented perpendicularly to said swing arc of said steering knuckle boss.

2. The axle assembly of claim 1 wherein each of said opposite ends of said stub shaft can be oriented for making contact with said contact surface of said axle housing by reversal of orientation of said stub shaft within said boss.

3. The axle assembly of claim 2 further comprising a clevis pin extending through said second of said apertures in said boss, said pin having removable means of retention of said pin within said boss.

4. The axle assembly of claim 3 wherein said retention means of said clevis pin within said boss comprises an aperture through said clevis pin disposed perpendicularly to said second of said apertures in said boss, and a pull pin selectively secured within said clevis pin aperture.

5. The axle assembly of claim 4 wherein said boss contains a visual marking, and said stub shaft contains a visual marking corresponding with each aperture, each respective marking of each aperture being disposed for alignment with said visual marking on said boss for establishing a visual indication of each selectable pivotal angle limit of said knuckle boss relative to said axle housing.

6. The axle assembly of claim 5 wherein said marking on said boss is a single arrow, and wherein each of said markings associated with each of said apertures in said stub shaft comprises an arrow and a numeral associated with each arrow representing an angular degree of freedom of rotation for one aperture of said stub shaft.

7. The axle assembly of claim 6 wherein said contact surface on said axle housing is integrally cast into said axle housing.

8. The axle assembly of claim 7 wherein said ends of said stub shaft are rounded and hardened to enhance wear characteristics of said ends.

9. The axle assembly of claim 8 wherein said contact surface on said axle housing is concave.

10. In an axle assembly including an axle housing, a steering joint coupled with said housing, said steering joint including a steering knuckle pivotal through an arc, said assembly also including a steering stop apparatus including stop means on said housing; an improvement comprising an adjustable steering axle stop apparatus defining an elongated member selectively fixed to said steering knuckle, said member having one of its ends disposed for contacting said stop means, said member having means for rigid securement thereof in a finite plurality of selective positions along said member, said stop means being effective to limit the angle of pivotal movement of said steering knuckle relative to said axle housing, said elongated member defining a cylindrical stub shaft, said axle assembly further comprising a boss fixed to said steering knuckle and pivotal therewith to define a swing arc, said boss comprising a pair of apertures, a first of said apertures disposed for containment of said stub shaft, said first aperture extending tangentially to said arc, the second of said apertures in said boss extending perpendicularly to an intersecting said first aperture, said second aperture disposed for containment of a removable clevis pin for selectively securing said stub shaft within said first aperture.

* * * * *